US012769246B2

(12) United States Patent
Arizono

(10) Patent No.: US 12,769,246 B2
(45) Date of Patent: Oct. 20, 2026

(54) IMAGE FORMING DEVICE

(71) Applicant: SHARP KABUSHIKI KAISHA, Sakai City (JP)

(72) Inventor: Takumi Arizono, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/331,119

(22) Filed: Sep. 17, 2025

(65) Prior Publication Data

US 2026/0077975 A1 Mar. 19, 2026

(30) Foreign Application Priority Data

Sep. 17, 2024 (JP) ................................ 2024-159815

(51) Int. Cl.

*G03G 21/16* (2006.01)
*B65H 29/52* (2006.01)
*B65H 31/02* (2006.01)
*G03G 15/00* (2006.01)

(52) U.S. Cl.

CPC ......... *G03G 21/1619* (2013.01); *B65H 29/52* (2013.01); *B65H 31/02* (2013.01); *G03G 15/6552* (2013.01); *G03G 21/1633* (2013.01); *B65H 2405/1412* (2013.01); *B65H 2801/06* (2013.01)

(58) Field of Classification Search

CPC ............................... B65H 29/52; B65H 31/02; B65H 2405/1412; B65H 2405/3322; G03G 15/6552; G03G 21/1633; G03G 21/1619

See application file for complete search history.

(56) References Cited

U.S. PATENT DOCUMENTS

| | | | | |
|---|---|---|---|---|
| 9,718,284 B2 * | 8/2017 | Hirose | ................... | B65H 31/24 |
| 2013/0287432 A1 | 10/2013 | Ikeda | | |
| 2015/0261175 A1 | 9/2015 | Ikeda | | |
| 2019/0010007 A1 * | 1/2019 | Yoneda | .................. | B65H 29/52 |

FOREIGN PATENT DOCUMENTS

| | | |
|---|---|---|
| JP | 2013231816 A | 11/2013 |

* cited by examiner

*Primary Examiner* — Jeremy R Severson

(74) *Attorney, Agent, or Firm* — ScienBiziP, P.C.

(57) ABSTRACT

An image forming device includes: a sheet discharge section that discharges a sheet toward a discharge tray, wherein a top plate portion covering at least a part of the discharge tray is provided above the sheet discharge section, the top plate portion is open on a downstream side in a discharge direction of the sheet and is provided with a gripping inhibition site on a lower surface side of the top plate portion facing the discharge tray, the gripping inhibition site includes ribs extending downward, and the ribs are disposed such that a plurality of first ribs arranged along the discharge direction and a plurality of second ribs arranged along a direction orthogonal to the discharge direction form a grid shape.

6 Claims, 8 Drawing Sheets

IMAGE FORMING DEVICE

CROSS-REFERENCE TO RELATED APPLICATION

The present application claims priority from Japanese Application JP2024-159815, the content to which is hereby incorporated by reference into this application.

BACKGROUND OF THE INVENTION

1. Field of the Invention

The present disclosure relates to an image forming device including a sheet discharge section.

2. Description of the Related Art

In an image forming device such as a copying machine or a printer, various structures for lifting a device main body have been proposed. For example, there are a structure in which a hole for a handle is provided in an opening/closing section provided on a side surface, a structure in which an elongated handle that can be accommodated in the device main body is provided, and the like. In addition, when the structure for lifting the device main body excessively stands out, there are concerns about deterioration of appearance quality; therefore, a method of suppressing the deterioration of appearance quality has also been proposed.

For example, a known image forming device includes an image former, an image reader that is installed above the image former and reads an image of a document, a frame that accommodates the image former, and a side cover that covers at least a part of the frame, and the image forming device is configured such that an upper edge portion of an opening provided in the side cover can be used as a handle when lifting the device main body.

SUMMARY OF THE INVENTION

In the known configuration as described above, a part of the side cover is discontinued by the opening, and thus a local load is likely to be applied to the upper edge portion of the opening, which may cause deformation or damage. Additionally, even when the handle is provided, the device main body is likely to be lifted when a hand is inserted into different recessed portions, which are not used for lifting the device main body, such as an edge portion of a top plate covering a discharge tray and a recessed portion for opening/closing a bypass tray, and thus deformation or damage may occur.

An object of the present disclosure is to provide an image forming device that can prevent deformation or damage caused by inserting a hand into an unintended portion and lifting a device main body.

To attain the object above, as means for solving the problem, an image forming device according to the disclosure includes a sheet discharge section that discharges a sheet toward a discharge tray. A top plate portion covering at least a part of the discharge tray is provided above the sheet discharge section. The top plate portion is open on a downstream side in a discharge direction of the sheet and is provided with a gripping inhibition site on a lower surface side of the top plate portion facing the discharge tray. The gripping inhibition site includes ribs extending downward, and the ribs are disposed such that a plurality of first ribs arranged along the discharge direction and a plurality of second ribs arranged along a direction orthogonal to the discharge direction form a grid shape.

Further, in the image forming device, the gripping inhibition site is preferably disposed in a region including a peripheral edge portion on an open side of the top plate portion.

Furthermore, in the image forming device, the first ribs preferably extend downward longer than the second ribs.

Additionally, in the image forming device, the first ribs preferably extend downward longer than the peripheral edge portion on an open side of the top plate portion.

Further, in the image forming device, the gripping inhibition site may include protrusions each protruding at an intersection between the first rib and the second rib.

Furthermore, in the image forming device, an opening/closing door located below the top plate portion and on an upstream side in the discharge direction may be provided at a device main body provided with the sheet discharge section. A handle portion by which the opening/closing door is opened and closed may be provided in the opening/closing door. A grip portion by which the device main body is lifted may be provided on a lower side of the opening/closing door.

According to the present disclosure, deformation or damage caused by inserting a hand into an unintended portion and lifting a device main body can be prevented.

DETAILED DESCRIPTION OF THE INVENTION

Figure 1:
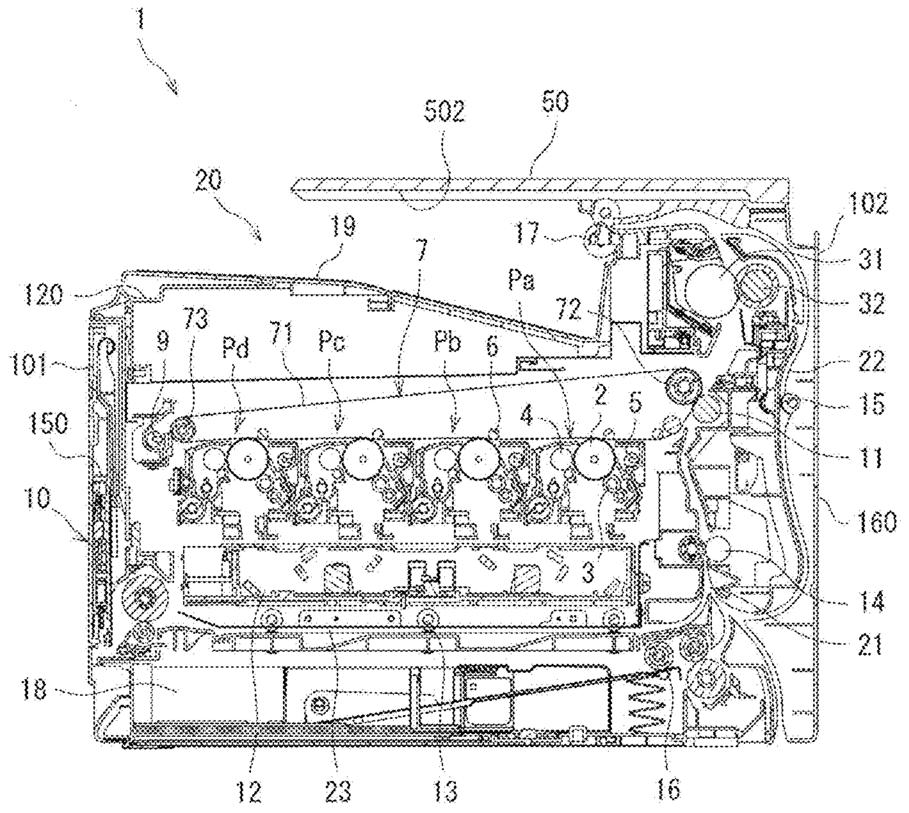
FIG. 1 is a schematic cross-sectional view illustrating a configuration of an image forming device according to a first embodiment.

An image forming device according to an embodiment of the disclosure will be described with reference to the accompanying drawings. Note that the same components in the first and second embodiments are denoted by the same reference numerals, and duplicated descriptions thereof will be omitted.

First Embodiment

Figure 2:
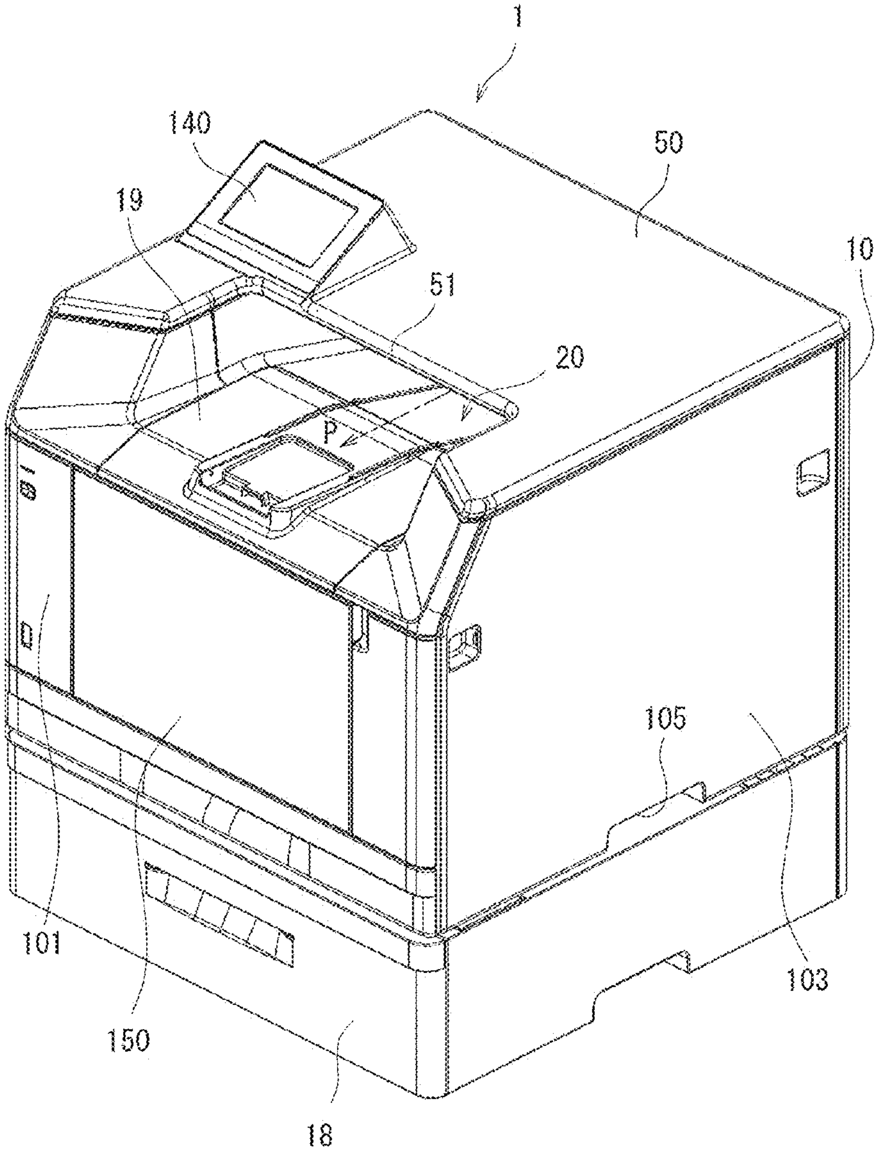
FIG. 2 is a perspective view of an external appearance of the image forming device.
Figure 3:
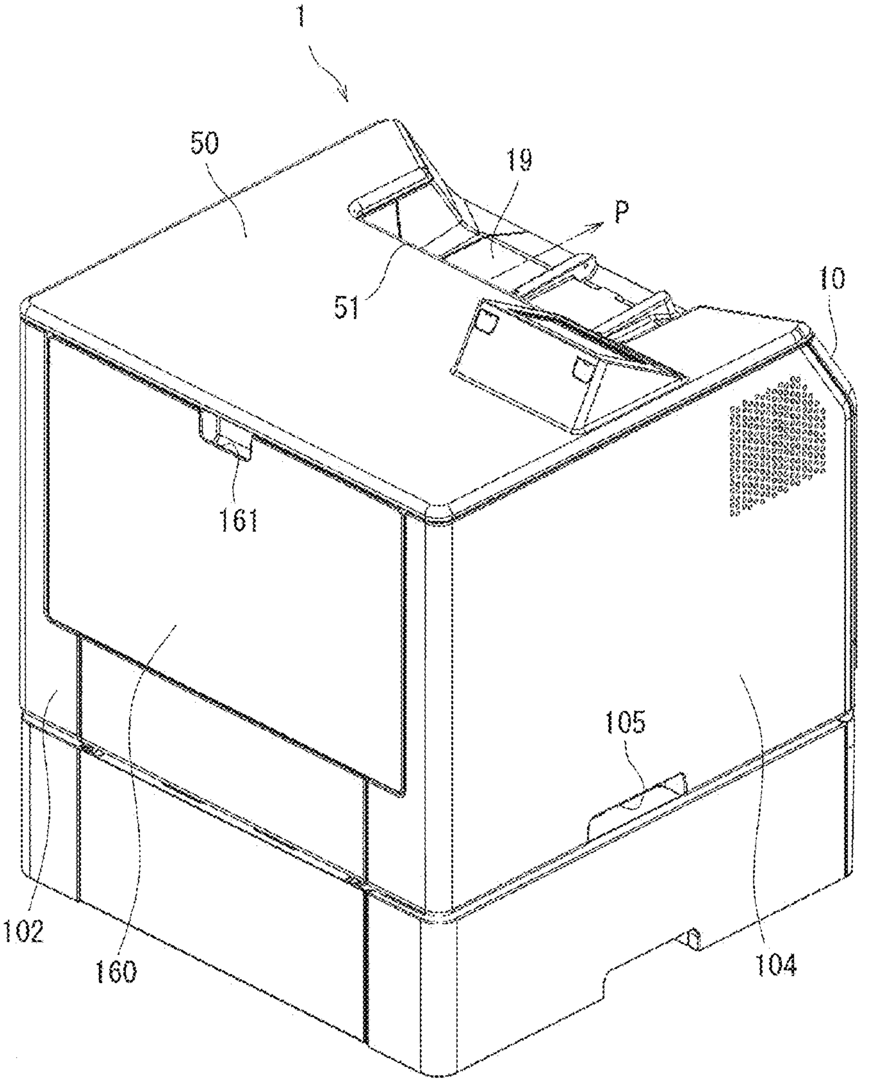
FIG. 3 is a perspective view of the external appearance of the image forming device.

FIG. 1 is a schematic cross-sectional view illustrating a configuration of an image forming device 1 according to the first embodiment of the disclosure, and FIGS. 2 and 3 are each a perspective view of an external appearance of the image forming device 1.

The image forming device 1 is, for example, a printer with a device main body 10 provided with an image former, and the image former includes a fixing device, a photoreceptor drum 2, a charger 3, a development device 4, a drum cleaning device 5, an intermediate transfer belt device 7, a secondary transfer roller 11, an optical scanning device 12, and the like.

The image forming device 1 deals with image data corresponding to a color image made of individual colors of black (K), cyan (C), magenta (M), and yellow (Y), or a monochrome image made of a single color (for example, black). Accordingly, the image forming device 1 is provided with four sets of the photoreceptor drums 2, four sets of the chargers 3, four sets of the development devices 4, four sets of the drum cleaning device 5 that form four types of toner images, with the sets respectively serving as image stations Pa, Pb, Pc, Pd corresponding to the colors black, cyan, magenta, and yellow, respectively.

The optical scanning device 12 exposes the surface of the photoreceptor drum 2 to form an electrostatic latent image. The development device 4 develops the electrostatic latent image on the surface of the photoreceptor drum 2 to form a toner image on the surface of the photoreceptor drum 2. The drum cleaning device 5 removes and collects residual toner on the surface of the photoreceptor drum 2. The charger 3 uniformly charges the surface of the photoreceptor drum 2 to a predetermined potential. With this series of operations described above, toner images of respective colors are formed on the respective surfaces of the photoreceptor drums 2.

The intermediate transfer belt device 7 includes intermediate transfer rollers 6, an intermediate transfer belt 71 having an endless shape, an intermediate transfer driving roller 72, an intermediate transfer driven roller 73, and a cleaning device 9. Four of the intermediate transfer rollers 6 are provided on the inner side of the intermediate transfer belt 71 to form the four types of toner images corresponding to the respective colors. The intermediate transfer rollers 6 transfer the toner images of the respective colors formed on the surfaces of the photoreceptor drums 2, to the intermediate transfer belt 71 that is moving in a circularly rotating manner.

The intermediate transfer belt 71 is stretched over the intermediate transfer driving roller 72 and the intermediate transfer driven roller 73. In the image forming device 1, the toner images of the respective colors formed on the surfaces of the respective photoreceptor drums 2 are sequentially transferred and superimposed to form color toner images on the surface of the intermediate transfer belt 71. The cleaning device 9 removes and collects waste toner that did not transfer to the sheet and remains on the surface of the intermediate transfer belt 71.

The secondary transfer roller 11 transports a sheet transported through a sheet transport path 21, with the sheet nipped, to a transfer nip portion between the intermediate transfer belt 71 and the secondary transfer roller 11. When the sheet passes through the transfer nip portion, the toner image on the surface of the intermediate transfer belt 71 is transferred onto the sheet, and then the sheet is transported to the fixing device.

The fixing device includes a fixing roller 31 and a pressure roller 32 that rotate around an axis. The fixing device heats and pressurizes the sheet on which the toner image is transferred while nipping the sheet in a nip portion between the fixing roller 31 and the pressure roller 32, and fixes the toner image onto the sheet.

A feeder 18 includes a sheet feeding cassette that stores recording media (sheets) to be used for image formation, and is provided below the optical scanning device 12. The sheet is pulled out from the feeder 18 by pickup rollers 16 and transported to the sheet transport path 21. The sheet transported to the sheet transport path 21 is guided to a sheet discharge section 20 via the secondary transfer roller 11 and the fixing device. In the sheet discharge section 20, the sheet is discharged to a discharge tray 19 by a discharge roller 17.

A registration roller 14 and the discharge roller 17 are disposed in the sheet transport path 21. The registration roller 14 transports the sheet at a speed equal to a process speed at which an image is formed. The registration roller 14 is provided between the feeder 18 and the secondary transfer roller 11, and adjusts a transport timing of the sheet so that the toner image is transferred to the sheet by the secondary transfer roller 11. For example, the registration roller 14 controls the transported sheet to wait (temporarily stop) in a state where the sheet is nipped, and starts transporting the sheet at a constant speed in synchronization with the secondary transfer roller 11.

When images are formed on both the front surface and the back surface of the sheet, a transport direction of the sheet is changed by the discharge roller 17, and the sheet is transported to a reverse transport path 22. In the reverse transport path 22, the front and back sides of the sheet are reversed by a reverse feeding roller 15, and the sheet is guided in the reversed state to the registration roller 14. The image forming device 1 forms an image on the back surface of the sheet guided to the registration roller 14 in a similar manner to when forming an image on the front surface, and discharges the sheet to the discharge tray 19 of the sheet discharge section 20.

In addition, a bypass tray 150 is attached to the device main body 10 so as to be openable and closable. The sheets stacked on the bypass tray 150 in the open state are supplied to a manual feed path 23. The manual feed path 23 merges with the sheet transport path 21 immediately before the registration roller 14. The sheet is transported to the registration roller 14 by conveyance rollers 13 disposed in the manual feed path 23, and an image is formed in the same manner as described above.

In FIG. 2, the sheet is discharged to the discharge tray 19 in a direction, which is indicated by arrow P in the drawing, as a discharge direction. When the downstream side in the discharge direction P is defined as a front surface 101 of the device main body 10 and the upstream side is defined as a rear surface 102 of the device main body 10, the bypass tray 150 is provided on the front surface 101 of the device main body 10. In addition, as illustrated in FIG. 3, an opening/closing door 160 is attached to the rear surface 102 of the device main body 10 located on the upstream side in the discharge direction P so as to be openable and closable. The opening/closing door 160 is provided with a handle portion 161, and when the opening/closing door 160 is opened by inserting a hand into the handle portion 161, the reverse transport path 22 is exposed, and a jammed sheet or the like can be collected.

The device main body 10 is provided with a display 140 including a liquid crystal display or the like. The display 140 displays a variety of information related to the image forming device 1 and receives input from a user. The display 140 is preferably provided at a position, which is easily visually recognized, for example, the top plate portion 50, the front surface 101 side of the device main body 10, or the like. Note that the front-rear direction of the device main body 10 is for explanatory convenience and is not intended to limit the installation mode or use mode of the device main body 10.

As illustrated in FIG. 2, the top plate portion 50 is arranged above the sheet discharge section 20 and disposed so as to cover at least a part of the discharge tray 19. The discharge tray 19 is formed so that the downstream side of the surface on which the sheet is placed is located at the level higher than the upstream side in the discharge direction P of the sheet.

The top plate portion 50 is disposed above the discharge tray 19 so as to face the discharge tray 19. The top plate portion 50 is provided with a recessed portion 51 on the downstream side in the discharge direction P corresponding to the discharge tray 19 formed to be located higher. In the illustrated mode, the recessed portion 51 is formed in a substantially U-shape that is open on the front surface 101 side, and thus the top plate portion 50 is open on the front surface 101 side. The sheet on the discharge tray 19 can be easily visually recognized through the recessed portion 51 and can be taken out by a hand inserted below the top plate portion 50.

As illustrated in FIGS. 2 and 3, grip portions 105 for lifting the device main body 10 are provided respectively on left and right side surfaces 103 and 104 continuous with the front surface 101 and the rear surface 102. In the illustrated mode, the grip portions 105 are located on the lower side of the opening/closing door 160, provided near lower portions of the side surfaces 103 and 104, and formed as recessed portions into which hands can be inserted. Thus, the image forming device 1 is configured such that the device main body 10 can be lifted by holding the grip portions 105 on the side surfaces 103 and 104. The feeder 18 may also be provided with a similar grip portion.

Figure 4:
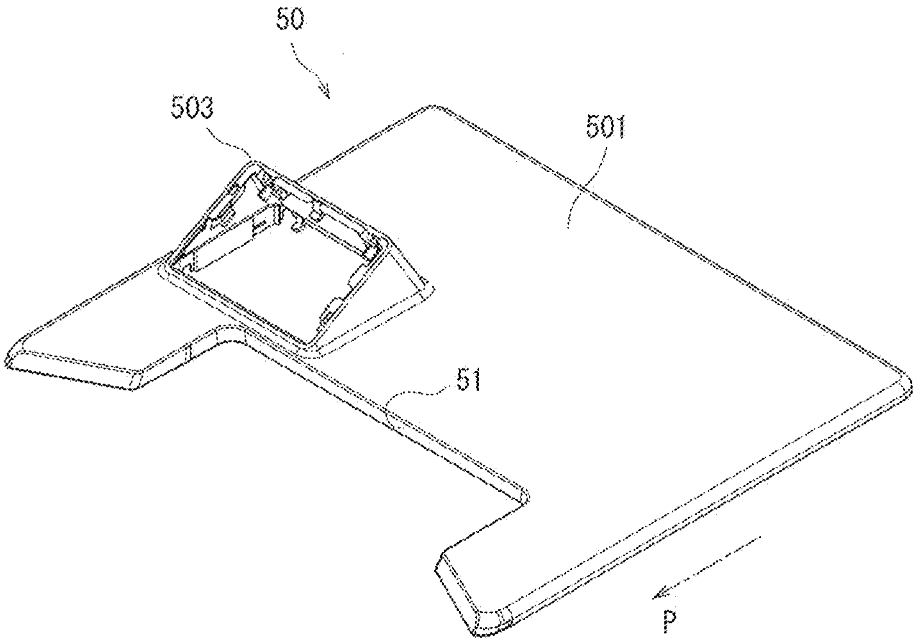
FIG. 4 is a perspective view illustrating an upper surface side of a top plate portion provided on a device main body of the image forming device.
Figure 5:
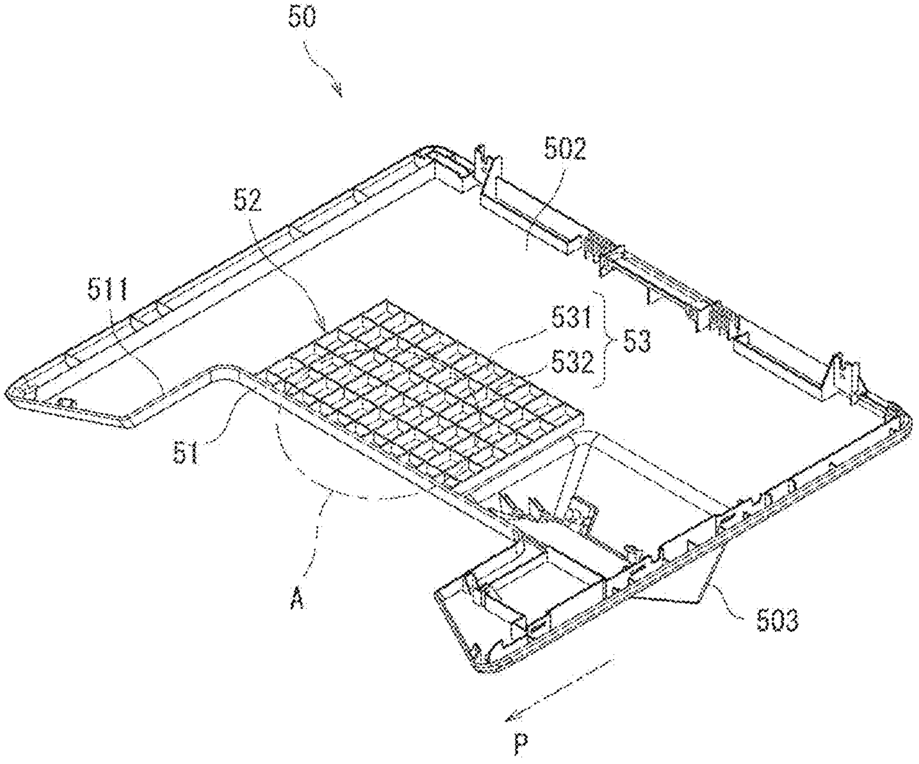
FIG. 5 is a perspective view illustrating a lower surface side of the top plate portion provided on the device main body of the image forming device.

FIGS. 4 and 5 illustrate the top plate portion 50 provided on the device main body. FIG. 4 is a perspective view illustrating an upper surface side of the top plate portion 50, and FIG. 5 is a perspective view illustrating a lower surface side of the top plate portion 50.

The top plate portion 50 includes a frame 503 that is disposed to protrude from an upper surface 501 formed in a flat shape and in which the display 140 is stored. A peripheral edge portion 511 having a protruding shape is disposed on a lower part of an outer periphery of the top plate portion 50. In the device main body 10, the upper surface 501 of the top plate portion 50 is disposed facing upward, and a lower surface 502 is disposed facing the discharge tray 19.

As illustrated in FIG. 5, the top plate portion 50 is provided with a gripping inhibition site 52 on the lower surface 502. The gripping inhibition site 52 is disposed in a region at a front part of the top plate portion 50, which includes at least the peripheral edge portion 511 constituting the outer periphery of the recessed portion 51. As illustrated, the gripping inhibition site 52 includes a plurality of ribs 53 extending downward.

Figure 6:
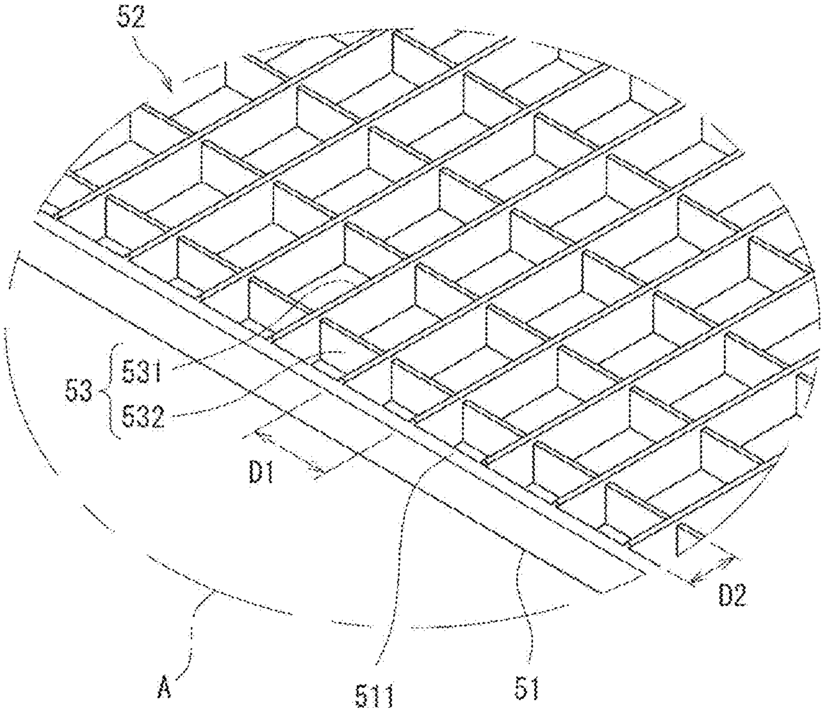
FIG. 6 is an enlarged perspective view illustrating Part A in FIG. 5.

FIG. 6 is an enlarged perspective view illustrating Part A in FIG. 5. The ribs 53 of the gripping inhibition site 52 include a plurality of first ribs 531 disposed along the discharge direction P and a plurality of second ribs 532 disposed along a direction orthogonal to the discharge direction P, and are disposed to stand upright in a grid shape as a whole.

The first rib 531 disposed along the discharge direction P extends downward longer than the second rib 532 orthogonal to the first rib 531. As illustrated in FIG. 5, in a state where the lower surface 502 is disposed facing upward, the first rib 531 of the top plate portion 50 is disposed to stand upright higher than the second rib 532.

The second rib 532 extends downward at a position lower than the first rib 531 on the lower surface 502 of the top plate portion 50; therefore, the second rib 532 is less likely to interfere with the sheet discharged along the discharge direction P. Further, the first rib 531 is disposed along the discharge direction P, and thus, even when the sheet comes into contact with the first rib 531, the sheet is smoothly discharged along the first rib 531.

Referring to FIGS. 2 and 3, the device main body 10 of the image forming device 1 includes the recessed portion 51 of the top plate portion 50 on the front surface 101 side, and includes the handle portion 161 of the opening/closing door 160 on the rear surface 102 side. In order to lift the device main body 10, the grip portions 105 are disposed on both the left and right sides as described above; however, the device main body 10 is likely to be lifted using the recessed portion 51 of the top plate portion 50 and the handle portion 161. In this way, when a user tries to lift the device main body 10 by inserting his/her hand into an unintended portion, for example, distortion occurs in the top plate portion 50, which may cause deformation or damage thereof.

In contrast, in the image forming device 1 according to the present embodiment, the gripping inhibition site 52 is disposed on the lower surface 502 of the top plate portion 50; therefore, when the user tries to hold the top plate portion 50 by inserting his/her hand into the recessed portion 51 of the top plate portion 50, the fingertips touch the gripping inhibition site 52. The gripping inhibition site 52 includes the ribs 53 having different heights including the first ribs 531 and the second ribs 532; therefore, it is recognized that the gripping inhibition site 52 is a section that is difficult to hold with the hand and is not suitable for lifting the device main body 10 by holding the top plate portion 50. This avoids lifting with an unintended portion gripped, and thus deformation or damage of the top plate portion 50 can be prevented.

In the gripping inhibition site 52, an interval D1 between the first ribs 531 is preferably 5 mm or more and within 20 mm. More preferably, the interval D1 between the first ribs 531 is 5 mm or more and within 15 mm. In addition, an interval D2 between the second rib 532 disposed closest to the peripheral edge portion 511 and the peripheral edge portion 511 is preferably 5 mm or more and within 20 mm, and more preferably 5 mm or more and within 15 mm.

By providing the interval D1 and the interval D2 as just described, when the user tries to hold the top plate portion 50, the fingertips inevitably come into contact with the ribs 53 of the gripping inhibition site 52, and it is recognized that the top plate portion 50 is a portion that is difficult to lift, and when trying to lift the top plate portion 50, the user feels pain in the finger. As a result, lifting by inserting his/her hand into the recessed portion 51 of the top plate portion 50 is avoided, and thus deformation or damage thereof can be prevented.

Figure 7:
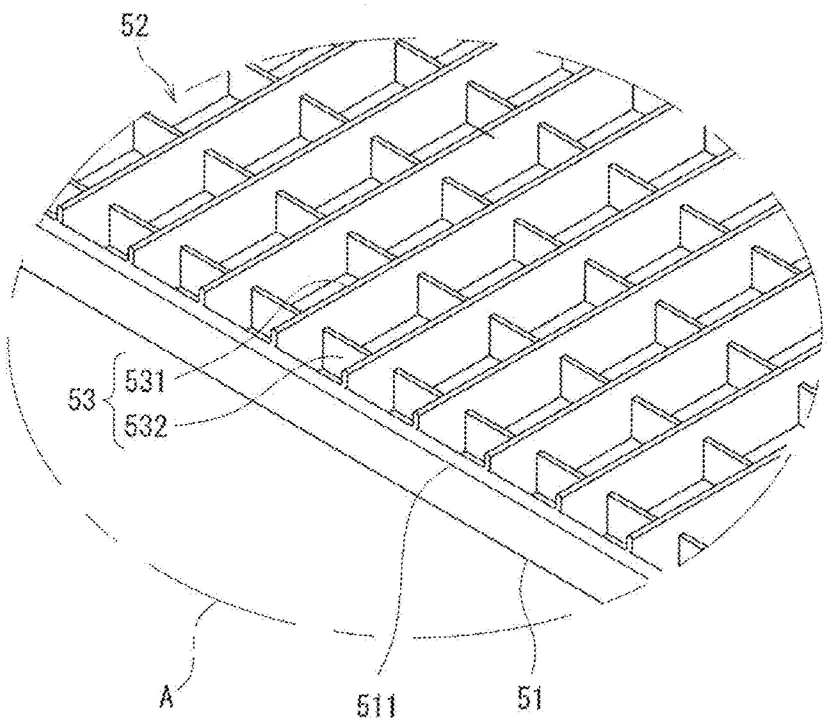
FIG. 7 is a perspective view illustrating another example of the lower surface side of the top plate portion.

FIG. 7 illustrates a modified example of the gripping inhibition site 52, and is an enlarged perspective view corresponding to Part A in FIG. 5. In the gripping inhibition site 52, the plurality of first ribs 531 disposed along the discharge direction P may protrude further downward than the peripheral edge portion 511 protruding downward and constituting the outer periphery of the top plate portion 50. In this case, the first rib 531 is disposed in a state of protruding the most. The amount of downward protrusion from the lower surface 502 of the top plate portion 50 increases in the mentioned order of the second rib 532, the peripheral edge portion 511, and the first rib 531. The amount of protrusion of the second rib 532 and the amount of protrusion of the peripheral edge portion 511 may be equal to each other.

This makes it even easier for the finger to touch the ribs 53 of the gripping inhibition site 52 and makes it more difficult to lift. In addition, the ribs 53 disposed on the lower surface 502 side of the top plate portion 50 are easily visually recognized in appearance, and thus the top plate portion 50 can be avoided from being held.

The gripping inhibition site 52 is not limited to being disposed in a partial region of the lower surface 502 of the top plate portion 50, and may be disposed in a wider region as long as the region includes the peripheral edge portion 511 of the recessed portion 51 and may also be disposed, for example, in the entire region of the lower surface 502.

Second Embodiment

Figure 8:
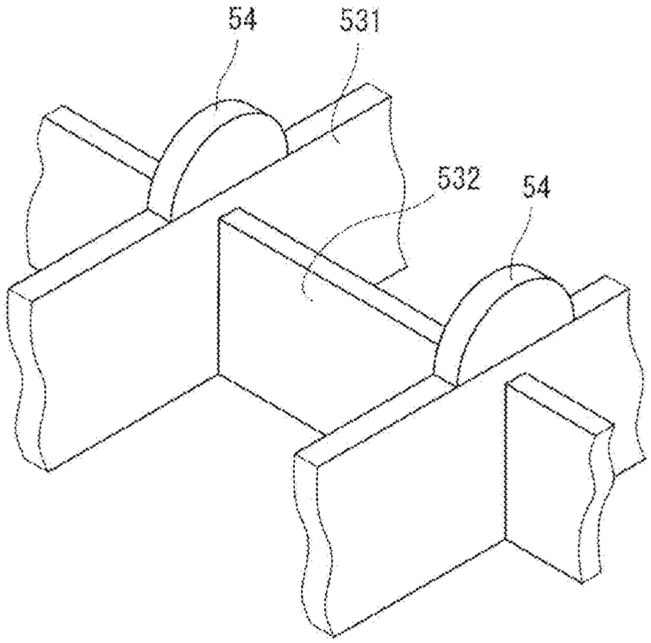
FIG. 8 is an enlarged perspective view illustrating a part of the top plate portion provided on the image forming device according to a second embodiment.

FIG. 8 is an enlarged perspective view illustrating a part of the gripping inhibition site 52 disposed in the image forming device 1 according to the second embodiment.

As the gripping inhibition site 52, a protrusion 54 protruding downward may be provided at an intersection between the first rib 531 and the second rib 532. The protrusion 54 may be, for example, a semicircular protrusion having a thickness equal to that of the first rib 531 and disposed along the first rib 531. The protrusion 54 is not limited to a semicircular protrusion as illustrated, and may be a triangular protrusion or the like with a sharp point.

The protrusion 54 is disposed along the first rib 531, and thus it is easy to stimulate the fingers without affecting the discharge of the sheet. Also, by providing such a protrusion 54, lifting by inserting his/her hand into the recessed portion 51 of the top plate portion 50 is avoided, and thus deformation or damage thereof can be prevented.

As described above, in the image forming device 1, by providing the gripping inhibition site 52 on the top plate portion 50 above the sheet discharge section 20, the top plate portion 50 that is an unintended portion can be avoided from being gripped and lifted, and deformation or damage of the top plate portion 50 and further damage of the device main body 10 can be prevented.

The image forming device 1 is not limited to the illustrated mode, and may have a configuration in which an upper housing and a lower housing are stacked and combined. Further, the image forming device 1 may be provided with a plurality of housings stacked, and two housings arranged adjacent to each other in an up-down direction may correspond to the upper housing and the lower housing. Furthermore, the image forming device 1 is not limited to a printer, and may be a multifunction apparatus that can form a multicolor or monochrome image in accordance with image data transmitted from the outside or image data read from a document by a scanner or the like, and has, for example, a copy function, a scanner function, a facsimile function, and a printer function.

The disclosure is not limited to the configurations described in the embodiments above, and various modifications can be made without departing from the technical gist of the disclosure. All technical matters included in the technical idea described in the claims are included in the scope of the disclosure. Although the embodiments described above illustrate preferred examples, various modified examples can be realized from the disclosed contents, and such modified examples are also included in the technical scope described in the claims.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming device comprising:

a sheet discharge section that discharges a sheet toward a discharge tray, wherein a top plate portion covering at least a part of the discharge tray is provided above the sheet discharge section, the top plate portion is open on a downstream side in a discharge direction of the sheet and is provided with a gripping inhibition site on a lower surface side of the top plate portion facing the discharge tray, the gripping inhibition site includes ribs extending downward, and the ribs are disposed such that a plurality of first ribs arranged along the discharge direction and a plurality of second ribs arranged along a direction orthogonal to the discharge direction form a grid shape.

2. The image forming device according to claim 1, wherein the gripping inhibition site is disposed in a region including a peripheral edge portion on an open side of the top plate portion.

3. The image forming device according to claim 1, wherein the first ribs extend downward longer than the second ribs.

4. The image forming device according to claim 3, wherein the first ribs extend downward longer than the peripheral edge portion on an open side of the top plate portion.

5. The image forming device according to claim 1, wherein the gripping inhibition site includes protrusions each protruding at an intersection between the first rib and the second rib.

6. The image forming device according to claim 1, wherein an opening/closing door located below the top plate portion and on an upstream side in the discharge direction is provided at a device main body provided with the sheet discharge section, and a handle portion by which the opening/closing door is opened and closed is provided in the opening/closing door, and a grip portion by which the device main body is lifted is provided on a lower side of the opening/closing door.

* * * * *